United States Patent Office 3,218,126
Patented Nov. 16, 1965

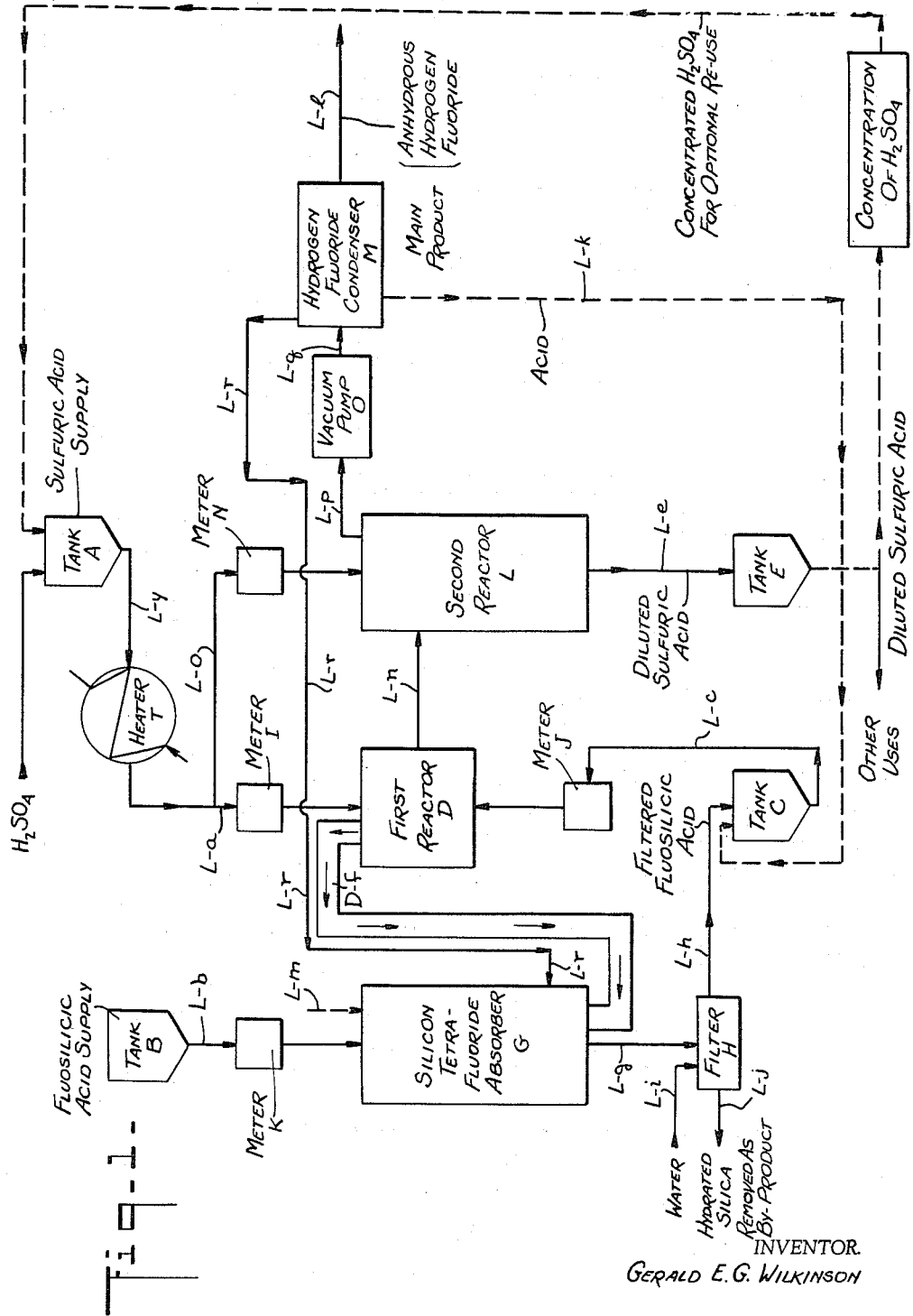

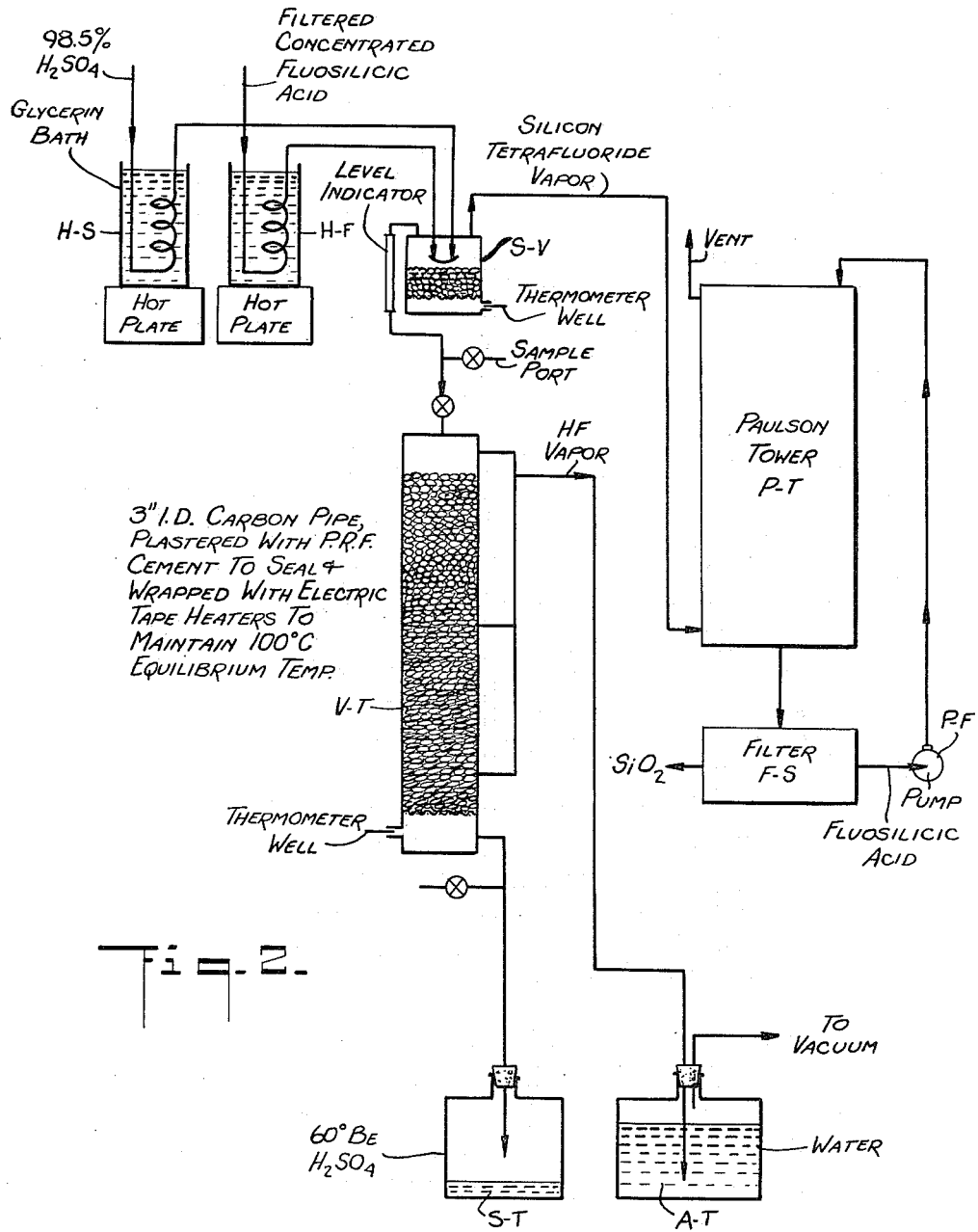

3,218,126
PROCESS OF PRODUCING HYDROGEN FLUORIDE IN A TWO-STAGE PROCEDURE AND EFFECTING EVOLUTION OF THE HYDROGEN FLUORIDE IN THE SECOND STAGE BY THE CONJOINT ACTION OF THE ADDITION OF HOT CONCENTRATED SULFURIC ACID AND THE APPLICATION OF VACUUM
Gerald E. G. Wilkinson, Temple Terrace, Fla., assignor, by mesne assignments, to Tennessee Corporation, New York, N.Y., a corporation of Delaware
Filed Sept. 10, 1962, Ser. No. 222,447
8 Claims. (Cl. 23—153)

The present application is related to co-pending applications of Llewellyn C. Oakley, Jr. and Theodore T. Houston (Serial No. 222,526), of Theodore T. Houston and Gerald E. G. Wilkinson (Serial No. 222,527), of Theodore T. Houston (Serial No. 222,443), and of Fred J. Klem (Serial No. 222,424), all of which have been assigned to a common assignee.

The present invention relates to an improved process of producing hydrogen fluoride in a two-stage procedure and effecting evolution of the hydrogen fluoride in the second stage by the conjoint action of the addition of hot concentrated sulfuric acid and the application of vacuum.

It is an object of the present invention to provide an improved process of producing hydrogen fluoride involving a two-stage procedure to effect the evolution of hydrogen fluoride in the second stage by the conjoint action of the addition of hot concentrated sulfuric acid and the application of vacuum.

Another object of the invention is to provide an improved process of producing hydrogen fluoride involving the dehydration and decomposition of clear fluosilicic acid with strong sulfuric acid under conditions of concentration of sulfuric acid, temperature and retention time so that substantially all of the silicon tetrafluoride present is evolved in the first stage as a substantially dry gas and is reabsorbed in water to produce more fluosilicic acid while the hydrogen fluoride is retained in a weaker sulfuric acid solution and is effectively liberated in the second stage in an efficient manner by the application of vacuum to the vapor phase over the solution and by the addition of concentrated sulfuric acid to the solution.

It is a further object of the invention to provide an improved process of producing hydrogen fluoride involving a two-stage procedure to retain substantially all of the hydrogen fluoride produced in the first stage in weak sulfuric acid and to liberate substantially all of the hydrogen fluoride in the second stage by the addition of concentrated sulfuric acid and by placing the larger reactor under the influence of vacuum.

The invention further contemplates providing an improved process of producing hydrogen fluoride in a two-stage procedure with practical equipment and operations on an industrial scale including the application of vacuum in the second stage.

Other objects and advantages will become apparent from the following description taken in conjunction with the accompanying drawings, in which:

FIG. 1 is a flow sheet illustrating the operations and equipment diagrammatically to carry the improved process into practice with two-stage procedure and with the application of vacuum in the second stage, and FIG. 2 depicts a flow sheet of the test equipment used in Example I.

Generally speaking, the present invention contemplates an improved process in which clear fluosilicic acid is treated in the first reactor with definite control of concentration of the sulfuric acid, temperature, and retention time so that essentially all the silicon tetrafluoride is evolved while most of the hydrogen fluoride remains in the acid leaving the reactor. When fluosilicic acid and sulfuric acid are mixed and the hydrogen fluoride and silicon tetrafluoride released as substantially dry gases, it has been found that the release of the hydrogen fluoride is much less rapid than is the release of the silicon tetrafluoride. In other words, the gases are released at two different rates.

Under the conditions of retention time and temperature at which a series of tests were performed [e.g. about two minutes at about 120° C. (248° F.)], essentially none of the hydrogen fluoride and above about ninety-six percent of the silicon tetrafluoride were liberated when the specific gravity of the residual solution was about 55.5° Bé. (corresponding to about 70.4% $H_2SO_4$). Under the same conditions when the terminal specific gravity was about 58.5° Bé. (corresponding to about 75.2% $H_2SO_4$) in excess of about 20% of the hydrogen fluoride was liberated with the residual silicon tetrafluoride being about 2.5%. It is thus apparent that a slight change in the terminal sulfuric acid concentration (in the foregoing case from about 70% to about 75% $H_2SO_4$) results in a substantial change in the quantity of hydrogen fluoride liberated in a given time, yet only a minor change in the quantity of silicon tetrafluoride remaining. As is obvious to one skilled in the art, the concentrations apply only to the retention time and temperature cited. With a longer retention time at the same temperature, the same results would be effected at a lower sulfuric acid concentration, or with a shorter retention time at a higher concentration; similarly with the same retention time and a higher temperature, a lower sulfuric acid concentration would effect the same results. For each temperature and retention time, there will be a concentration of sulfuric acid which will result in essentially or substantially all of the silicon tetrafluoride liberated and essentially or substantially all of the hydrogen fluoride retained.

Practical considerations, however, somewhat limit the range of concentrations to be used. At lower concentrations, say below about 50° Bé., either temperatures must be higher causing unnecessary corrosion problems or retention time must be long causing larger and more expensive equipment. At higher concentrations above say about 63° Bé., either the retention time must be kept so low that control becomes a problem, or temperature must be so low that it becomes necessary to heat the highly corrosive sulfuric acid stream containing the hydrogen fluoride, in order to have a sufficiently high temperature in the second reactor.

The range of about 55° Bé. to about 60° Bé. was found to be the most satisfactory. Silicon tetrafluoride gas is absorbed by water or by the water contained in the supply of fluosilicic acid to build up a stronger fluosilicic acid and to produce a hydrated silica as a precipitate. While any suitable strength sulfuric acid and/or fluosilicic acid can be used, provided they can be mixed in such proportions to yield the desired concentrations in the first and second reactors, certain practical considerations limit the concentrations when the process is carried into practice on an industrial scale. In the case where the sulfuric acid is to be concentrated for re-use in the process, a minimum quantity should be used to keep down concentration cost. In the case where the sulfuric acid used in the process is to be used in the production of superphosphate or wet process phosphoric acid, the quantity used must not exceed the quantity consumed in the acidulation of phosphate rock to produce the quantity of fluosilicic acid to be treated. For example, when one ton of normal superphosphate is produced, approximately 0.36 tons of 100% sulfuric acid are required and from about 15 to 25 pounds of fluosilicic acid (100% basis) are recovered. The strength of the fluosilicic acid leaving the absorption tower would have to be sufficiently concentrated so that all of it could be reacted with the available sulfuric acid.

Hydrated silica is filtered off as a by-product and is washed with water. The filtered or clear fluosilicic acid thus-produced is sent back to the first reactor. Hot sulfuric acid containing most of the hydrogen fluoride goes immediately to the second reactor where more concentrated sulfuric acid is added which brings up the temperature and the concentration. Hydrogen fluoride is released from the sulfuric acid and is condensed in a hydrogen fluoride condenser.

The necessary controls and conditions in the second reactor are as follows:

Four inter-related variable factors determine the conditions in the second reactor. They are:
(1) The temperature of the sulfuric acid solution of hydrogen fluoride.
(2) The terminal concentration of the sulfuric acid solution.
(3) The retention time.
(4) The vacuum applied.

The temperature has as its upper limit the boiling point of the particular strength of sulfuric acid utilized. While there is no theoretical lower limit; however, practical considerations fix the lower limit in the range around about 90° C. (194° F.). At temperatures much below about 90° C., the release of hydrogen fluoride becomes slow requiring excessive retention time and large equipment for substantially complete release of the hydrogen fluoride.

The terminal sulfuric concentration has an upper limit of about 100% $H_2SO_4$ and theoretically has no well defined lower limit. Practically speaking, however, below a concentration of about 65% $H_2SO_4$ release of hydrogen fluoride is excessively slow.

As is well known to one skilled in the art, retention time is a function of other conditions imposed upon the reaction. Under conditions of high temperature, sulfuric acid concentration and a high vacuum, retention time in the order of about one minute or so is sufficient for substantially complete release of the hydrogen fluoride. On the other hand, without the application of vacuum and at low temperatures and sulfuric acid concentration, several hours are required.

The higher the vacuum the more rapidly the dissolved hydrogen fluoride is released. Practically speaking, operating vacuum is largely controlled by the cost of commercially available equipment. The vacuum readily attainable with conventional equipment, i.e., 20–28 inches of mercury, is satisfactory.

The following illustrative examples will enable one skilled in the art to select appropriate combinations of the foregoing factors to provide conditions to give the best or preferred results for any given situation.

In carrying the invention into practice, it is preferred to use the operations and the equipment illustrated in FIG. 1.

A supply of concentrated sulfuric acid, such as commercially available of about 66° Bé. acid as produced by the conventional contact process, is provided by tank A and a supply of filtered aqueous fluosilicic acid is provided by tank C. The sulfuric acid flows from tank A through line L–y to heater T which heats it to a selected and controlled temperature. After heating, the hot acid flows through line L–a to meter I which controls the proper amount going to reactor D. Materials of construction to this point can be those conventionally used in the art to handle the strength of sulfuric acid employed as those skilled in the art understand. The filtered fluosilicic acid is also fed to reactor D and flows from tank C through line L–c and meter J which are plastic or rubber-lined and which control the amount.

In reactor D, such as a graphite or fluorocarbon lined vessel, aqueous fluosilicic acid is dehydrated by concentrated sulfuric acid. The retention time, temperature, and terminal concentration of the liquid leaving the reactor are controlled so that substantially all of the silicon tetrafluoride and a small portion of the hydrogen fluoride are liberated as gases while most of the hydrogen fluoride remains in the sulfuric acid. Silicon tetrafluoride gases leave reactor D via duct D–f to a plastic or rubber-lined absorber G for silicon tetrafluoride.

Fresh aqueous fluosilicic acid flows from tank B through meter K via line L–b to absorber G. To prevent small losses or minimize the escapage of fumes to the atmosphere, additional water may be optionally added to absorber G via line L–m. In the silicon tetrafluoride absorber, silicon tetrafluoride reacts with water to form fluosilicic acid and a precipitate of silica. The slurry of silica and fluosilicic acid flows via line L–g to rubber-covered filter H where the precipitate of silica is removed and washed with water supplied by line L–i. The clear or filtered fluosilicic acid flows via line L–h and is recycled in the process to rubber-lined or plastic tank C. The precipitate of silica is removed via conveyor L–j for other uses or further processing.

The sulfuric acid stream flows from reactor D via line L–n to graphite or fluorocarbon lined reactor L. Additional hot concentrated sulfuric acid is added by line L–o through meter N from sulfuric acid supply tank A. In reactor L, hydrogen fluoride is stripped from the sulfuric acid solution. The sulfuric acid, which is now diluted with the water in the fluosilicic acid, leaves through line L–e to tank E. From tank E, it can be concentrated for re-use in this process or it can be utilized in other processes.

The substantially dry hydrogen fluoride leaves reactor L via line L–p to a vacuum pump O and then to a hydrogen fluoride condenser M via line L–q. In order to evolve and recover substantially all of the hydrogen fluoride in an efficient manner it was found that an effective vacuum should be maintained. In practice, I found that a vacuum of at least 15 inches of mercury should be maintained. For satisfactory results, I found that a vacuum of about 22 to about 26 inches of mercury was desirable and was effective for recovering hydrogen fluoride efficiently.

Anhydrous hydrogen fluoride leaves the condenser via line L–l to storage or utilization. When operating conditions are selected, a small quantity of aqueous hydrogen fluoride normally will be condensed in the inlet portion of the condenser due to slight carry-over of water. The solution coming from the hydrogen fluoride condenser M may be recycled via line L–k to the aqueous fluosilicic acid supply tank C. In addition, a small quantity of silicon tetrafluoride present as an impurity will not condense and is separated and returned to the absorber G via line L–r. The sulfuric acid, which is now diluted with the water in the fluosilicic acid and forms an aqueous acid solution, leaves the second reactor L through line L–e to tank E. From this point, it can be concentrated for re-use in this process or utilized in other processes.

For the purpose of giving those skilled in the art a better understanding of the invention and/or a better appreciation of the advantages of the invention, the following illustrative examples are given:

*Example I*

Test equipment was assembled as illustrated diagrammatically in FIG. 2 for Example I. Generally speaking, the test equipment comprised the following:

Glycerin baths H–S and H–F are provided for heating the sulfuric acid and filtered fluosilicic acid, respectively. The heated acids are conducted to a vaporizer S–V for silicon tetrafluoride ($SiF_4$) vapor. The vapor is conducted to a Paulson Tower P–T for absorption of silicon tetrafluoride. The vent in the top of the tower is open to the atmosphere.

In the Paulson Tower, silicon tetrafluoride is absorbed in the aqueous solution containing fluosilicic acid and is converted into hydrated silica and more fluosilicic acid. The precipitated silica is filtered from the solution containing fluosilicic acid in filter F–S. For pumping the fluosilicic acid solution from the filter to the top of the Paulson Tower for recycling is pump P–F. One large and one small section of 3″ I.D. carbon pipe suitably sealed to be gas tight and wrapped with electrical tape heaters constitute vaporizing towers S–V and V–T for evolving silicon tetrafluoride vapor and hydrogen fluoride vapor, respectively, from the sulfuric acid solution, these towers are shown with filling or packing as illustrated in FIG. 2. The gases and vapors containing hydrogen fluoride evolved from tower V–T are absorbed in absorption tank A–T which contains water and which is under the influence of a vacuum. From the bottom of tower V–T, sulfuric acid flows to storage tank S–T.

In order to simplify the test, all of the sulfuric acid was fed to the first reactor, rather than a portion to the second reactor as would be performed in actual practice.

In both runs sulfuric acid (about 98.5%) was fed at a rate of about 40 ml./min. and fluosilicic acid (about 27%) at 20 ml./min. This resulted in a terminal sulfuric acid concentration of about 80% $H_2SO_4$.

Vacuum in the second reactor was maintained at about 5 inches of mercury during the first run and about 22 inches of mercury during the second. Results of the two runs are as follows:

| Vacuum in second reactor inches Hg: | Portion of HF removed from sulfuric acid, percent |
|---|---|
| 5 | 42 |
| 22 | 99 |

It is apparent from these results that under essentially the same condition of temperature, surface-to-volume ratio and terminal sulfuric acid concentration increasing vacuum from about 5 inches of mercury to about 22 inches of mercury increases the evolution of HF from less than half to substantially all of the available HF.

*Example II*

In this test, the first reaction was conducted in an agitated vessel. The retention time was about 4 minutes, the temperature about 125° C. (257° F.) surface to volume ratio about 0.10, and the strong sulfuric acid and filtered aqueous fluosilicic acid used in proportions to give a liquid stream of sulfuric acid leaving the reactor a concentration of about 55° Bé. (69.65% $H_2SO_4$) at 15.6° C. (60° F.).

For the second reactor a carbon tower packed with coke was used. Sulfuric acid containing hydrogen fluoride and coming from the first reactor, together with 98.5% sulfuric acid, was introduced in the top of the carbon tower in proportions to give a 60° Bé. [$H_2SO_4$ calculated at 15.6° C. (60° F.)] leaving the tower. This sulfuric acid has a concentration of about 77.67% and a down-flow rate was maintained at about 19 gallons per hour per square foot. Retention time was of the order of about two to about five minutes. Average temperature was about 100° C. (212° F.) and the heat losses were quite high. A vacuum of about 22 inches of mercury on the second reactor was maintained.

About 3130 pounds of 98.5% of sulfuric acid flows from the sulfuric supply tank A via line L–y to and through heater T. From heater T via line L–a to and through meter I and into the first reactor D. Simultaneously with the sulfuric acid flow, about 1594 pounds of filtered 25% $H_2SiF_6$ along with about 5 pounds of about 80% HF flows from fluosilicic storage tank C via line L–c to and through meter J to the first reactor D.

After about four minutes retention time, at a temperature of about 125° C. (257° F.) in the first reactor D, substantially all of the silicon tetrafluoride gas (about 287 pounds) together with about 10 pounds of hydrogen fluoride gas is evolved from the first reactor and is exited via line D–f to the silicon tetrafluoride absorber G. The gases are absorbed in absorber G with about 629 pounds of 20% $H_2SiF_6$ which flows from fluosilicic acid supply in tank B via line L–b to and through meter K to the absorber G. About 717 pounds of water are also supplied to absorber G via line L–m. The slurry of fluosilicic acid and silica (about 1594 pounds of 25.3% $H_2SiF_6$ and about 50.2 pounds $SiO_2$) discharges from absorber G via line L–g to filter H. The silica precipitate is washed on the filter H with about 50 pounds of water and removed via line L–j to storage. Associated with the silica are about 45 pounds of water and about 5 pounds of fluosilicic acid ($H_2SiF_6$). Leaving filter H via line L–h, about 1592 pounds of 25% fluosilicic acid discharges into fluosilicic acid storage tank C.

The sulfuric acid from the first reactor (about 4426 pounds of about 69.6% $H_2SO_4$) containing about 105.9 pounds of hydrogen fluoride (HF) and about 0.7 pound of silicon tetrafluoride ($SiF_4$) leaves the first reactor D via line L–n and enters the second reactor L. Simultaneously with the acid flowing from reactor D to reactor L about 1306 pounds of 98.5% sulfuric acid flow via line L–y to and through heater T. From heater T the acid flows via line L–o to and through meter N and thence to the second reactor L.

With a retention time of from about two to about five minutes and with an average temperature of about 100° C. (212° F.), the down-flow rate through the tower was adjusted to about 19 gallons per hour per square foot and the proportions of the two sulfuric acids were adjusted give a 60° Bé. $H_2SO_4$ (about 77.67%) leaving the tower Substantially all of the hydrogen fluoride (about 105 pounds of HF together with about 0.7 pound of $SiF_4$ and about 1 pound of $H_2O$) was evolved from the tower acid solution under the influence of a vacuum and was exited from the tower reactor via line L–p to and through vacuum pump O. A vacuum was maintained at about 22 inches of mercury. From vacuum pump O via line L–q the hydrogen fluoride went to condenser M. From hydrogen fluoride condenser M, about 100 pounds of anhydrous hydrogen fluoride was discharged via line L–l to storage or utilization. From condenser M via line L–k about 5 pounds of impure HF (about 4 pounds of HF, and about 1 pound of $H_2O$) were sent to fluosilicic storage tank C. The 0.7 pound of $SiF_4$ does not condense and is returned with about 1 pound of HF absorber G via line L–r. The sulfuric acid (about 5625 pounds of 77.67% $H_2SO_4$) containing about 0.6 pound HF left the second reactor L via line L–e to storage tank E.

The present invention is particularly applicable to situations such as the following:

In the manufacture of superphosphate, the phosphate rock normally employed contains from about three to four percent fluorine. In the operation, about 25 to about 40% of the fluorine is evolved and must be scrubbed from the vapors leaving the den. When absorbed in water, a dilute fluosilicic acid results, which frequently presents a disposal problem. Sulfuric acid as produced by the contact process is more concentrated than is optimum for the production of superphosphate. The discovery herein disclosed affords a method of converting the otherwise undesirable waste fluosilicic acid into a valuable product, anhydrous hydrogen fluoride, at the same time converting the sulfuric acid to be used to a more desirable strength.

The same situation is true in the production of "wet process" phosphoric acid in which about 20% to about 50% of the fluorine values in the rock are liberated and must be recovered.

From the tremendous tonnage of phosphatic fertilizers consumed each year, the great value of this discovery is apparent.

In still another section of the art, this discovery has great value. The resources of high grade fluospar used in the production of hydrogen fluoride by conventional processes are somewhat limited. This process permits the utilization of low grade (high silica) fluospar ($CaF_2$). The fluospar is acidulated with the used acid from the process and the fluoride containing vapors absorbed in water to produce a mixture of hydrofluoric and fluosilicic acids. The mixture can then be converted by this process to pure anhydrous hydrogen fluoride.

It is to be noted that the present process contemplates the use of the discovery that in a two-stage operation the conjoint use of the addition of concentrated sulfuric acid in the second reactor and the application of vacuum thereto facilitates the release of hydrogen fluoride from the sulfuric acid solution and makes the recovery of hydrogen fluoride very effective. This dispenses with the necessity of using large expensive vessels as reactors which would be required to effect substantially complete evolution of the hydrogen fluoride. As expensive materials of construction, such as carbon or Teflon for the lining, etc., are needed in these vessels, the commercial importance of the discovery is obvious to one skilled in the art.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a process of producing hydrogen fluoride as dry vapor from fluosilicic acid-containing solutions in a two-stage procedure, the improvement which comprises subjecting a fluosilicic acid-containing solution substantially devoid of free silica to the action of heated concentrated sulfuric acid in a closed reactor in the first stage under conditions of concentration of sulfuric acid, temperature, and retention time so that substantially all of the silicon tetrafluoride is evolved in the first stage as substantially dry vapor while most of the hydrogen fluoride is retained in the resultant diluted weaker sulfuric acid solution, withdrawing said vapor containing silicon tetrafluoride from said closed reactor in said first stage, removing said resultant diluted weaker sulfuric acid solution containing hydrogen fluoride from said closed reactor in the first stage, conducting said removed solution to a closed second reactor having a gas space above the top of the solution in a second stage, introducing into said closed reactor hot concentrated sulfuric acid of sufficiently high strength to maintain a terminal concentration effective to cause liberation of hydrogen fluoride as substantially dry vapor, maintaining the top of said second reactor in the second stage under the constant action of a vacuum to effect liberation of substantially all of the hydrogen fluoride from said solution, and condensing said liberated hydrogen fluoride withdrawn from said second reactor in said second stage by means of said vacuum.

2. The process set forth in claim 1 in which the concentration of the concentrated sulfuric acid in the treated solution is controlled sufficiently high to assure a terminal concentration between about 65% $H_2SO_4$ and about 98% $H_2SO_4$ to facilitate the rapid evolution of vapor.

3. The process set forth in claim 1 in which the space in the top of the second reactor is subjected to the action of vacuum of about 20 to about 28 inches of mercury to effectively withdraw vapor of hydrogen fluoride.

4. The process set forth in claim 1 in which the amount of solution and sulfuric acid in a reactor is controlled to the size of a reactor to obtain a selected surface-to-volume ratio effective to facilitate the rapid evolution of vapor.

5. The process set forth in claim 1 in which silicon tetrafluoride is reacted with water to form fluosilicic acid and to precipitate hydrated silica, and the precipitate of hydrated silica is removed from said fluosilicic acid to provide a clear solution which is pumped to a reactor.

6. The process set forth in claim 1 in which said silicon tetrafluoride is passed through an absorber containing an aqueous solution with sufficient water to convert silicon tetrafluoride into a precipitate of hydrated silica and fluosilicic acid, and the precipitate of hydrated silica is removed and recovered as a by-product.

7. The process set forth in claim 1 in which the sulfuric acid is kept in contact with the solution for a period of time of at least about 2 minutes to effect the evolution of vapor.

8. The process set forth in claim 1 in which the volume of the body of solution to the surface of a reactor is adjusted to provide a surface-to-volume ratio of at least about one to one.

References Cited by the Examiner

UNITED STATES PATENTS

| | | | |
|---|---|---|---|
| 465,607 | 12/1891 | Beylikgy | 23—153 |
| 1,851,652 | 3/1932 | Soll et al. | 23—153 |
| 1,938,533 | 12/1933 | Penfield | 23—153 |
| 1,960,347 | 5/1934 | Osswald et al. | 23—153 |
| 2,833,628 | 5/1958 | Molstad | 23—205 |
| 3,024,086 | 3/1962 | Cines | 23—153 X |

MAURICE A. BRINDISI, *Primary Examiner.*

UNITED STATES PATENT OFFICE
CERTIFICATE OF CORRECTION

Patent No. 3,218,126                        November 16, 1965

Gerald E. G. Wilkinson

It is hereby certified that error appears in the above numbered patent requiring correction and that the said Letters Patent should read as corrected below.

Column 1, line 39, for "evloved" read -- evolved --; column 6, line 32, before "give" insert -- to --; same line 32, after "tower" insert a period; line 46, after "HF" insert -- to --.

Signed and sealed this 27th day of September 1966.

(SEAL)
Attest:

ERNEST W. SWIDER                            EDWARD J. BRENNER
Attesting Officer                                Commissioner of Patents